United States Patent [19]
Kuerschner

[11] Patent Number: 4,770,064
[45] Date of Patent: Sep. 13, 1988

[54] SPEED GEAR CHANGE RESPONSIVE ENGINE TORQUE REDUCING SYSTEM

[75] Inventor: Michael Kuerschner, Stuttgart, Fed. Rep. of Germany

[73] Assignee: Daimer-Benz Aktiengesellschaft, Stuttgart, Fed. Rep. of Germany

[21] Appl. No.: 848,826

[22] Filed: Apr. 7, 1986

[30] Foreign Application Priority Data

Apr. 6, 1985 [DE] Fed. Rep. of Germany ....... 3512604

[51] Int. Cl.$^4$ ............................................. B60K 41/04
[52] U.S. Cl. ...................................... 74/858; 74/866; 74/867; 74/872
[58] Field of Search ................. 74/856, 857, 858, 859, 74/860, 872, 866

[56] References Cited

U.S. PATENT DOCUMENTS

| | | | |
|---|---|---|---|
| 2,890,603 | 6/1959 | Harris et al. | 74/740 |
| 3,712,156 | 1/1973 | Kuhnle | 74/858 |
| 3,718,056 | 2/1973 | Felder et al. | 74/865 |
| 3,789,702 | 2/1974 | Price | 74/859 |
| 3,814,224 | 6/1974 | Podssuweit et al. | 74/858 X |
| 3,939,738 | 2/1976 | Adey et al. | 74/859 |
| 4,223,573 | 9/1980 | Franssen | 74/866 X |
| 4,226,141 | 10/1980 | Espenscheid | 74/859 X |
| 4,228,700 | 10/1980 | Espenscheid et al. | 74/866 |
| 4,266,447 | 5/1981 | Heess et al. | 74/866 X |
| 4,355,550 | 10/1982 | Will et al. | 74/866 X |
| 4,403,527 | 9/1983 | Mohl et al. | 74/858 X |
| 4,520,694 | 6/1985 | Eschrich et al. | 74/858 |

Primary Examiner—Leslie A. Braun
Assistant Examiner—James W. Innskeep
Attorney, Agent, or Firm—Barnes & Thornburg

[57] ABSTRACT

A device is provided for reducing the engine torque when shifting a speed-change gear transmission connected downstream of an internal combustion engine. A final engine torque control element is connected to a control device which cause the final control element to reduce the engine torque dependent on certain operating conditions dictated by speed and load of the internal combustion engine and upon the occurrence of a switching signal, with interposition of at least one timing element. To obtain precise timing between shifting and engine intervention, the arrangement is made such that the switching signal is triggered synchronously to the torque reversal at a lockable reaction gear element of a planetary wheel gear involved in the shifting so as to cause the final control element to reduce the engine torque without any time delay.

19 Claims, 4 Drawing Sheets

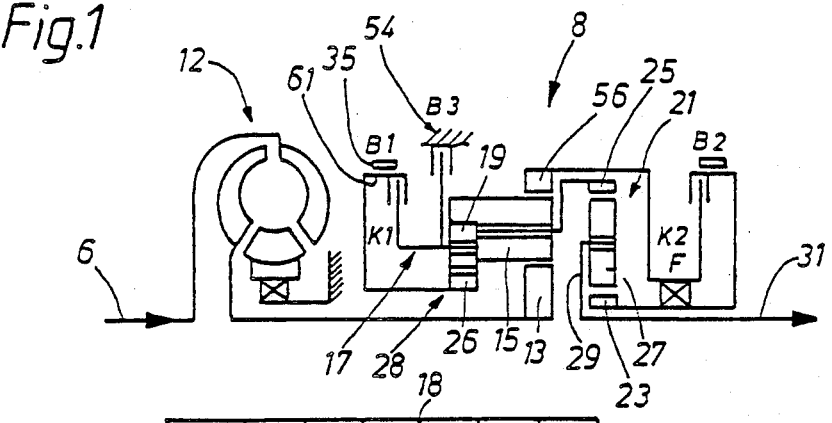
Fig.1
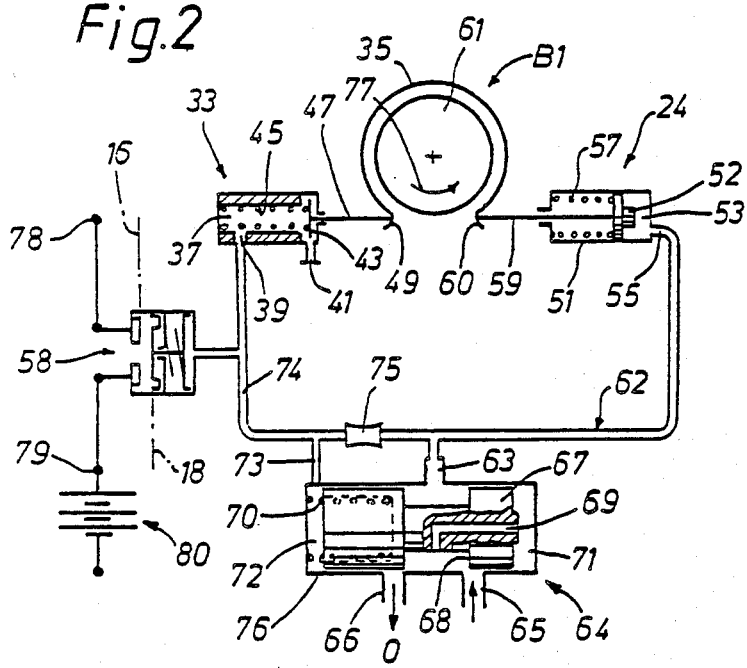
Fig.1A
Fig.2

SPEED GEAR CHANGE RESPONSIVE ENGINE TORQUE REDUCING SYSTEM

BACKGROUND AND SUMMARY OF THE INVENTION

The invention relates to a device for controlling engine torque in response to shifting between gears of a gear speed change transmission driven by an engine.

In a known device of this type (German Patent Specification No. 2,842,389), such switching signals must be used which are timed to occur before the actual shift operation, because a torque reduction even before disengagement of the old gear is aimed for. This necessitates the use of timing elements which can only be matched with difficulty to the shifting operation for controlling both the final control element for the torque reduction and the shift final control elements for shifting.

An object on which the invention is based is to construct a system which facilitates triggering of the engine intervention for torque reduction at the right moment of maximum heat generation in the friction shift final control elements to prevent as great a proportion as possible of the quantities of shifting induced heat which would be otherwise generated with shifting without torque reduction.

This object is achieved according to the invention by providing a control apparatus which automatically generates a switching signal in response to torque reversal at a reaction gear element of the transmission which switching signal is supplied to control the engine torque.

In the apparatus, constructed according to preferred embodiments of the invention, the engine intervention for torque reduction when shifting up is initiated precisely at the start of shifting, that is in the period of greatest heat generation of the shift transmission, whereby a considerable proportion of the quantities of heat which would otherwise be generated are avoided.

In especially preferred embodiments of the invention, a torque reduction before the start of shifting is also deliberately dispensed with when shifting down under load to avoid inevitable timing inaccuracies with regard to controlling the breakaway operation in the shift element to be disengaged. This is so as there is the risk that the torque is decreased even before the actual start of speeding up. This would mean that not only smooth shifting, but also valuable acceleration time would be lost. The gentle downturn in torque at the start of shifting down is achieved simply and reliably in the device according to preferred embodiments of the invention by hydraulic throttling in conjunction with a pressure transducer upon disengagement of the shift element.

The advantages achieved by the devices constructed according to the invention with regard to the reduction in the quantities of shifting or frictional heat are particularly significant in the case of shifting under load.

As the quantities of heat in the friction shift final control elements occurring in the full load range or in the vicinity of the full load range, without torque reduction, constitute a multiple of the quantities of heat generated in the partial load range, in devices according to certain especially preferred embodiments of the invention a blocking of the torque reduction is provided by way of a blocking device operated on by signals which reflect the engine operating load.

In order to be able to use the different signals at a reaction gear element in shifting up to a certain gear on the one hand and shifting up from this gear on the other hand for the control of torque reduction, devices according to certain especially preferred embodiments of the invention include timing elements for controlling the duration of the torque reduction as a function of whether an upshift or a downshift of the transmission is effected.

In order to be able to match the duration of the torque reduction to the different conditions when shifting up on the one hand and when shifting down on the other hand in the device according to especially preferred embodiments of the invention, means are provided for assuring that the time period of torque reduction is shorter for downshifting than for upshifting.

Other advantageous features of the present invention relate to the specific simple electronic circuit components which are used to effect a reliable and economical construction for optimally controlling the engine torque during and shortly after gear shifting operation.

Devices constructed according to specifically preferred embodiments of the invention are simple in construction, and yet precise, because the torque jump at the brake band abutment device of the reaction gear element is used for generating the switching signal.

In devices constructed according to especially preferred embodiments of the invention, it is advantageous that no timing elements are necessary for fixing the start of torque reduction. In this way, the effects of frictional value variations and fluctuating speed-up times of the internal combustion engine, which arise from changes in the engine state, of the oil temperature, of the water temperature, of the air pressure, of the air humidity etc., are completely avoided.

Further objects, features, and advantages of the present invention will become more apparent from the following description when taken with the accompanying drawings which show, for purposes of illustration only, several embodiments in accordance with the present invention.

BRIEF DESCRIPTION OF THE DRAWINGS

FIG. 1 is a schematic representation of a drive arrangement of the type contemplated by the present invention, including an internal combustion engine with planetary wheel speed-change gear transmission connected downstream;

FIG. 1A is a shift table for the change-speed gear transmission of FIG. 1;

FIG. 2 is a schematic representation of a hydraulic actuation device for a shifting brake of the speed-change gear of FIG. 1, with a pressure switch for generating a switching signal, constructed according to a preferred embodiment of the invention;

DETAILED DESCRIPTION OF THE DRAWINGS

Figure 3:
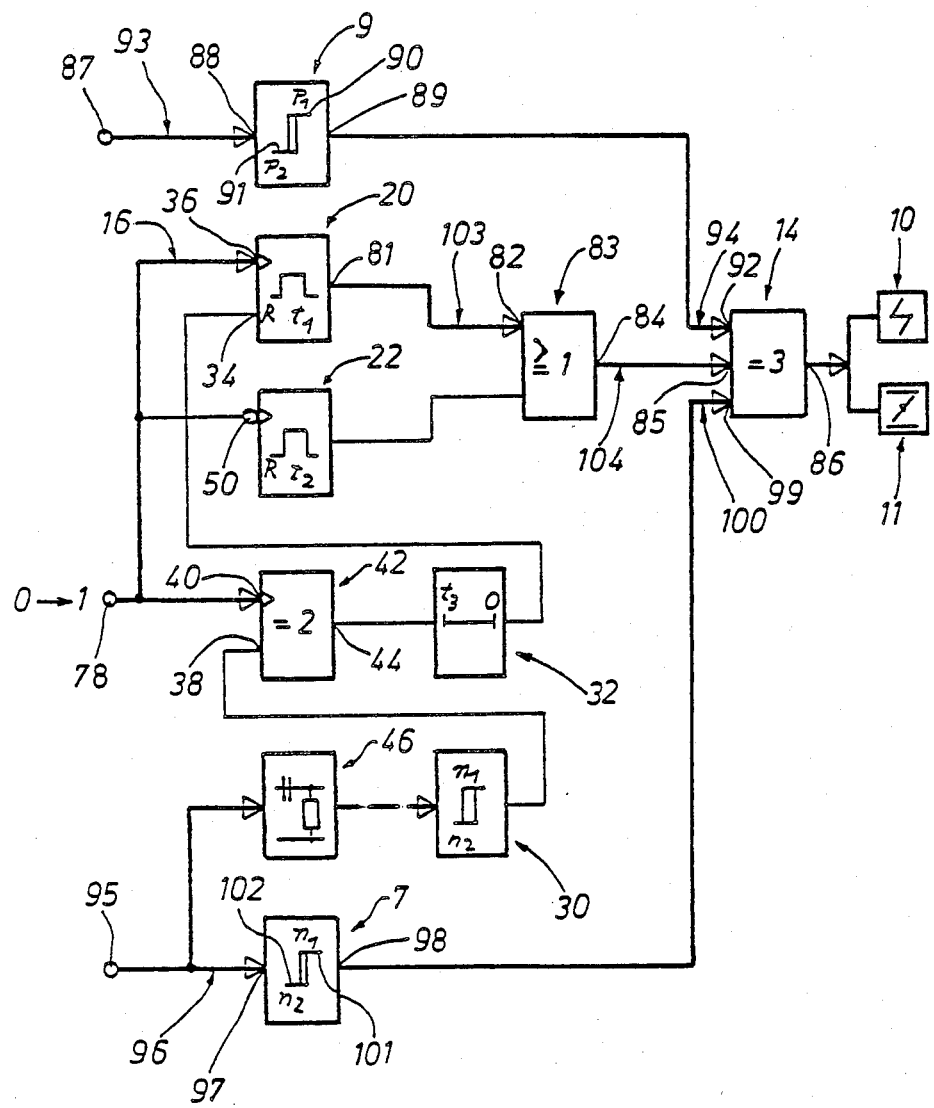
FIG. 3 is a block circuit diagram of final control elements and control means of the device according to a preferred embodiment of the invention with a signal flow indicated by arrows for shifting up of the speed-change gear of FIGS. 1 and 2 from Ist to IInd gear.

With reference to FIGS. 1 and 2, the crankshaft 6 of an internal combustion engine constantly drives an inner, larger central wheel 13 of a Ravigneaux gear unit 28 in the usual way via a hydrodynamic torque converter 12, the Ravigneaux gear unit representing a partial gear of a planetary wheel speed-change gear transmission 8. In the Ravigneaux gear unit 28, an inner central wheel 13 and an outer central wheel 56 mesh with longer main planets 15, which are rotatably borne on a planetary wheel carrier 17 which is connected by a shift-clutch K1 to a smaller inner central wheel 26. Central wheel 26 meshes with shorter, smaller secondary planets 19, which likewise are rotatably borne on the planetary wheel carrier 17 and for their part mesh with the main planets 15. The smaller, inner central wheel 26 and the planetary wheel carrier 17 are lockable each by a shift brake B1 or B2, respectively.

The outer central wheel 56 is connected both by an overrunning clutch F and by a shifting clutch K2 to an inner central wheel 23 of a single-arm planetary wheel gear 21 unit. In gear unit 21 the inner central wheel 23 and an outer central wheel 25, which is connected secure against rotation to the planetary wheel carrier 17 of the Ravigneaux gear 28, mesh with planets 27 which are rotatably borne on a planetary wheel carrier 29 connected secure against rotation to an output shaft 31. The inner central wheel 23 is lockable by a shift brake B2. The overrunning clutch F blocks a backward rotation of the outer central wheel 56 with respect to the inner central wheel 23.

According to the shift table of FIG. 1A, the shift brake B1 is engaged only in the middle IInd gear—the shift brake B2 in all three gears I to III—the shifting clutch K1 in the IIIrd gear and the shifting clutch K2 in the Ist gear.

As, in the Ist gear, the smaller, inner central wheel 26 of the Ravigneaux gear unit 28 revolves freely, i.e. is not involved in the torque transmission, in this gear the outer central wheel 56, which is then operating as a reaction gear element, is supported via the overruning clutch F—and after the engagement operation—via the shifting clutch K2 against the locked inner central wheel 23.

On the other hand, in the IInd gear in the Ravigneaux gear unit 28, the smaller inner central wheel 26 is locked as reaction gear element by the shift brake B1, whereby the outer central wheel 56 also revolves unsupported in the rotational drive direction.

In the shift table, the two shift states of the inner central wheel 26 operating as a reaction gear element of the Ravigneaux gear unit 28 in the IInd gear are symbolized as switching signal 16 for the locked state and as switching signal 18 for the unlocked state.

The pressure change in a hydraulic abutment device 33 (FIG. 2) of a brake band 35 of the shift brake B1 which occurs directly upon transition between the two shift states is used to generate the switching signals 16 and 18.

The abutment device 33 has a fixed pressure chamber 37 with a pressure connection 39 and a substantially pressure-relieved zero connection 41.

A piston valve 43 operating in the abutment device 33 is held by an abutment spring 45 in an end position in which the two connections 39 and 41 are joined to each other. The piston valve 43 is connected by a thrust piece 47 to one brake band end 49 of brake band 35.

A pressure medium final control element 24 is provided with a piston 52 which operates in a fixed cylinder 51 and is impinged on its one face by the pressure of a pressure chamber 53 and is connected on its other face via a thrust piece 59 to the other brake band end 60 of the brake band 35. The piston 52 is held by a compression spring 57 in an end position in which the brake band 35 is lifted with respect to a brake drum 61 which is connected secure against rotation to the smaller inner central wheel 26.

The pressure chamber 53 is provided with a pressure connection 55 which is connected via a brake pressure line 62 to a controlled pressure connection 63 of a brake pressure regulating valve 64. The brake pressure regulating valve 64 has a regulating slide valve 67, which operates in a valve cylinder 76 and bounds by its faces pressure chambers 71 and 72 in the valve cylinder 76. In its middle region, the regulating slide valve 67 has a control groove 68 running in the circumferential direction, an inner pressure passage 69 of the regulating slide valve 67 opening out on one side in the control groove 68 and on the other side in the pressure chamber 71. In the other pressure chamber 72, having a pressure connection 73, a valve spring 70 is arranged between regulating slide valve 67 and valve cylinder 76. The pressure connection 39 of the abutment device 33 is connected unrestrictedly by an abutment pressure line 74 to a pressure switch 58 and also to the pressure connection 73 of the valve cylinder 76. On the other hand, between the brake pressure line 62 and the abutment pressure line 74 there is merely a restricted connection via a restrictor 75.

The control groove 68 of the regulating slide valve 67 operates with a controlled pressure connection 65 of the valve cylinder 76, which pressure connection is connected to a gear shift valve in a way not shown in more detail, and also operates with a substantially pressure-relieved zero connection 66 of the valve cylinder 76 such that when there is pressure relief in the abutment device 33 (via the zero connection 41) and brake pressure at the pressure connection 65 of the brake pressure regulating valve 64 (coming from the gear shift valve), in the brake pressure line 62 there is a constant low application pressure, fixed by the valve spring 70, under which pressure the brake band 35 is applied with an initially weak braking effect to the brake drum 61 still turning in the rotational drive direction 77. At the movement at which the torque direction at the brake drum 61 is reversed, owing to the servo effect at the thrust piece 47 of the now leading brake band end 49, the abutment force of the abutment spring 45 abruptly comes into action, so that the piston valve 43 blocks the pressure chamber 37 with respect to the zero connection 41, whereby a control pressure builds up in the pressure chamber 72 via the restrictor 75, which control pressure actuates the regulating slide valve 67 into its end position which blocks the zero connection 66 and in which the controlled pressure connection 63 is under the full brake pressure of the brake connection 65. This pressure increase makes the piston 52 apply the brake band 35 with the full force of actuation to the brake drum 61.

The pressure increase explained above in the pressure chamber 37 of the abutment 33 also causes the pressure switch 58 to be actuated out of its spring-switched position for the switching signal 18 into its position for the switching signal 16, in which a connection terminal 78 is connected to a terminal 79 of a battery 80.

Figure 4:
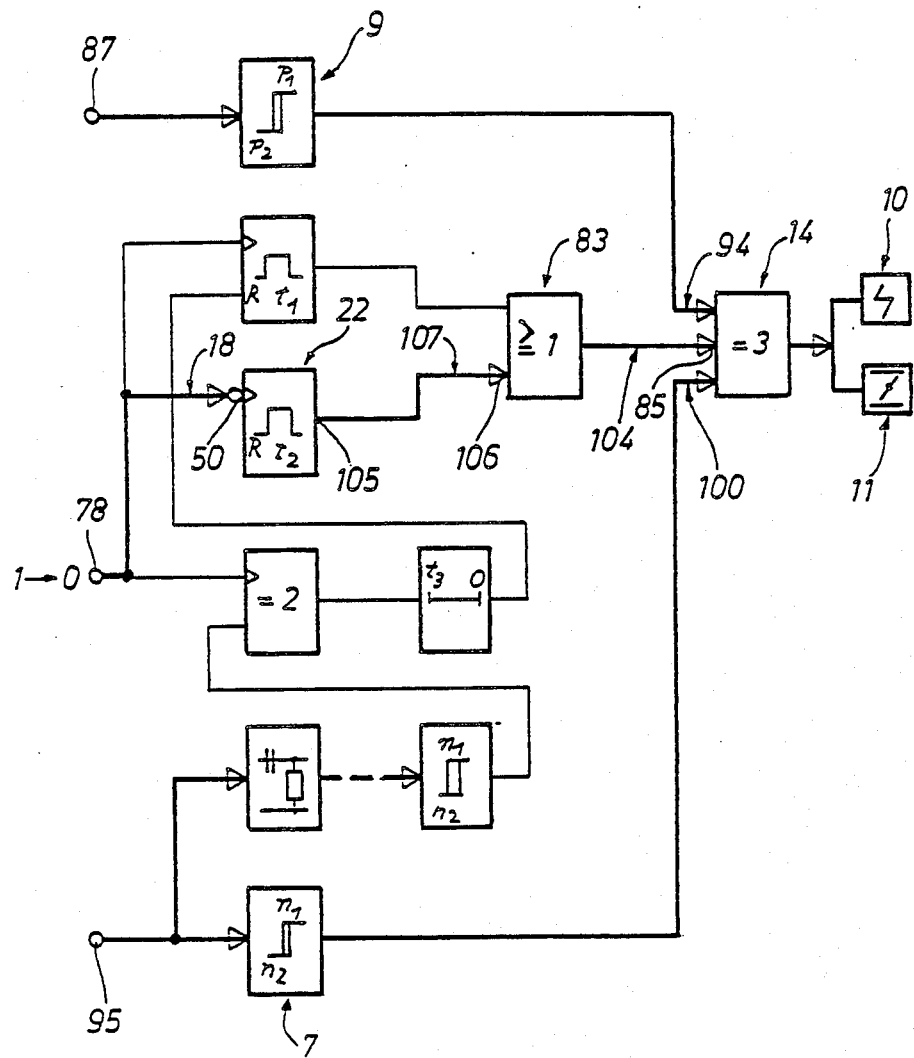
FIG. 4 is a block circuit diagram of the system of FIG. 3 with a signal flow indicated by arrows for shifting up of the speed-change gear of FIGS. 1 and 2 from IInd to IIIrd gear.
Figure 5:
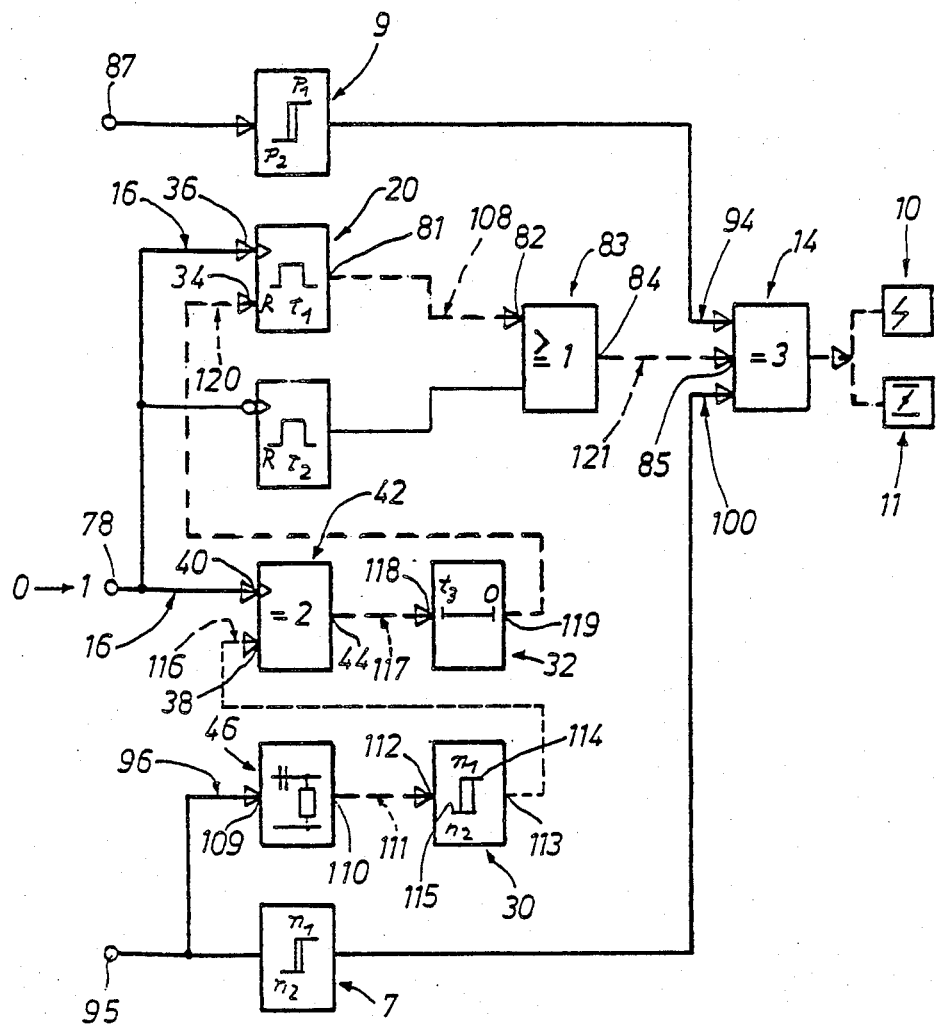
FIG. 5 is a block circuit diagram of the system FIG. 3 with a signal flow indicated by arrows for shifting down of the speed-change gear of FIGS. 1 and 2 from IIIrd to IInd gear.

According to FIGS. 3 to 5, the connection terminal 78 is connected to a set input 36 of a first timing element 20, to an inverted set input 50 of a second timing element 22 and to an input 40 of an AND element 42.

The first timing element 20 is connected by its output 81 to an input 82 of an OR element 83, the output 84 of which is connected to an input 85 of an AND element 14, which is in effective connection via its output 86 with a final control element 10 for the adjustment of the ignition point and/or with a final control element 11 for the setting of the flow rate of the fuel or fuel/air mixture of the internal combustion engine (crankshaft 6) of FIG. 1.

A further connection terminal 87 carries a voltage signal 93 which is analogous to the engine loading, in this case to the intake pipe vacuum, of the internal combustion engine (crankshaft 6) of FIG. 1 and is applied to the input 88 of a Schmitt trigger 9. At the output 89 of the Schmitt trigger 9, which is connected to a further input 92 of the AND element 14, an output signal 94 is applied if the intake pipe vacuum exceeds an upper limit value 90, e.g. 800 mbar. The output signal 94 ceases if the intake pipe vacuum drops below a lower limit value 91, e.g. 750 mbar.

A third connection terminal 95 carries a voltage signal 96 which is analogous to the speed of the crankshaft 6 of FIG. 1 and is applied to the input 97 of a Schmitt trigger 7. The Schmitt trigger 7 is connected via its output 98 to a third input 99 of the AND element 14. A signal 100 is applied to the output 98 if the speed of the crankshaft 6 exceeds an upper limit value 101, e.g. 4000 rpm. The output signal 100 ceases if the speed of the crankshaft 6 drops below a lower limit value 102, e.g. 3800 rpm.

When shifting from Ist gear to IInd gear, the shift brake B1 is actuated in the way already explained above, with the pressure switch 58 triggering the switching signal 16 which is applied to the set input 36 of the timing element 20. When the switching signal 16 occurs, a signal 103 occurs at the output 81 of the timing element 20 over a time period $t_1$, e.g. of 400 msec, so that, via the OR element 83, a signal 104 is also applied to the input 85 of the AND element 14.

If, in this switching up to IInd gear, the operating point of the internal combustion engine (crankshaft 6) is in the full load range or in the vicinity of the full load range, the two other signals 94 and 100 are also applied to the AND element 14 on the input side, so that the final control element 10 or 11, respectively, is induced over the time period $t_1$ to reduce the torque of the internal combustion engine (crankshaft 6) of FIG. 1.

When shifting up from IInd gear to IIIrd gear, the pressure switch 58 is opened if the pressure connection 65 at the brake pressure regulating valve 64 is relieved and the shifting clutch K1 engages, so that the torque direction at the brake drum 61 is reversed and the latter begins to turn in the rotational drive direction.

By opening the pressure switch 58, the switching signal 18 of the connection terminal 78 is applied to the inverted set input 50 of the second timing element 22 (FIG. 4). The timing element 22 is connected via its output 105 to a second input 106 of the OR element 83, so that a signal 107 is applied to the input 106 and consequently also the signal 104 is applied to the input 85 of the AND element 14 over the period $t_2$, e.g. 400 msec, of this timing element. If the operating point of the internal combustion engine (crankshaft 6) of FIG. 1 is again in the full load range, the input signals 94 and 100 of the Schmitt triggers 9 and 7 connected to the respective connection terminal 87 or 95 are applied to the AND element 14, so that the final control element 10 or 11, respectively, reduces the torque of the internal combustion engine over the operating period $t_2$.

When shifting down from IIIrd to IInd gear (FIG. 5), the reaction gear element (inner central wheel 26) is locked by the shift brake B1, so that the switching signal 16 is applied to the set input 36 of the first timing element 20 and to one input 40 of the AND element 42 via the connection terminal 78. The timing element 20 emits undelayed an output signal 108 via its output 81 to the input 82 of the OR element 83, so that a signal 121 is also applied to the input 85 of AND element 14 via the output 84 of the OR element 83. If the operating point of the internal combustion engine (crankshaft 6) of FIG. 1 is in the full load range in this down-shift, then the input signals 94 and 100 of the Schmitt triggers 9 and 7 connected to the respective connection terminal 87 or 95 are also applied to the AND element 14, so that the final control element 10 or 11, respectively, reduces the torque.

The connection terminal 95 carrying the voltage signal 96 which is analogous to the speed of the internal combustion engine (crankshaft 6) of FIG. 1 is connected to the input 109 of a differentiating element 46, which emits via its output 110 a signal 111 which is analogous to the change in speed over time to the input 112 of a Schmitt trigger 30. The Schmitt trigger 30 emits via its output 113 a signal 116 to the second input of the AND element 42, if the change in speed is positive and exceeds an upper limit value 114, e.g. 2505 rpm per sec., which is the case when shifting down from IIIrd to IInd. The output signal 116 ceases if the change in speed has dropped below a lower limit value 115, e.g. 2500 rpm per sec.

Thus, when the signal 116 occurs, the AND element 42 emits a signal 117 via its output 44 to the input 118 of a delay element 32, which emits via its output 119 a signal 120 to the reset input 34 of the timing element 20 with a delay of $t_3$, which must be shorter than the operating period $t_1$ of the timing element 20 for shifting up and is, e.g. 100 msec. The signals 108 and 121 consequently go out after $t_3$ seconds, whereby the torque reduction when shifting down is kept considerably shorter than when shifting up. This is advantageous because the switching signal when shifting up occurs at an earlier time than when shifting down.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Control apparatus for controlling engine torque in response to gear shift changes in a speed change gear transmission of the type having a reaction gear element means which is selectively brakable by braking means during gear shift changes, said control apparatus comprising, switching control means for automatically generating a switching signal in direct response to torque reversal at the reaction gear elements means, and engine control element means for controlling changes in engine torque in response to said switching signal, said switching control means and engine control element means being operable to automatically control engine torque during shifting wherein said engine control element means includes:
a first timing element actuable in response to a switching signal corresponding to a change from an unbraked to a braked condition of the reaction gear element means during one of upshifting and downshifting of the speed change gear transmission;
a second timing element actuable in response to a switching signal corresponding to a change from a braked to an unbraked condition of the reaction gear element means during the other of upshifting and downshifting of the speed change gear transmission; and
final control element means actuable by an output signal of one of said first and second timing elements to reduce engine torque.

2. Control apparatus according to claim 1, wherein said reaction gear element means is a reaction wheel gear of a planetary gear unit.

3. Control apparatus according to claim 1, wherein said engine control element means includes means for reducing engine torque in response to said switching signal.

4. Control apparatus according to claim 3, wherein said engine control element means includes switching signal blocking means for blocking the switching signal to prevent reducing of the engine torque when the engine is not operating in its full load range.

5. Control apparatus according to claim 4, wherein said blocking means includes an AND element with an output connection to final engine torque control means and input connections with said switching signal and at least one engine load signal representative of engine load conditions.

6. Control apparatus according to claim 1, wherein said braking means operably brakes the reaction gear element means when said transmission is in an intermediate speed gear and is operably released from the reaction gear element means when said transmission is shifted from the intermediate speed gear to respective lower and higher speed gears, and
wherein said engine control element means includes down-shift detection means operably connected to at least one of the timing elements so that the time period of torque reduction is shorter during a downshift from the intermediate speed gear than during an upshift from the intermediate speed gear.

7. Control apparatus according to claim 6, wherein said down-shift detection means includes a Schmitt trigger operable in response to changes in engine rotational speeds.

8. Control apparatus according to claim 6, further comprising time delay element means interposed between the downshift detection means and a reset input of one of the timing elements which has a set input connected to said switching signal corresponding to braking of the reaction gear element means.

9. Control apparatus according to claim 8, wherein said downshift detection means includes a Schmitt trigger operable in response to changes in engine rotational speeds.

10. Control apparatus according to claim 8, further comprising an AND element having an output connected to the time delay element means, a first input connected to the output of the downshift detection means, and a second input connected to the set input of the one of the timing elements.

11. Control apparatus according to claim 10, wherein said downshift detection means includes a Schmitt trigger operable in response to changes in engine rotational speeds.

12. Control apparatus according to claim 8, wherein said downshift detecting means is supplied with input signal from differentiating means responsive to rates of changes in engine speed.

13. Control apparatus according to claim 12, wherein said downshift detection means includes a Schmitt trigger operable in response to changes in engine rotational speeds, and wherein said differentiating means is operably disposed at the input side of the Schmitt trigger means.

14. Control apparatus according to claim 13, further comprising an AND element having an output connected to the time delay element means, a first input connected to the output of the downshift detection means, and a second input connected to the set input of the one of the timing elements.

15. Control apparatus according to claim 1, wherein said switching control means includes a pressure switch for generating the switching signal in response to hydraulic reaction pressure which is automatically generated upon actuation of said braking means.

16. Control apparatus according to claim 15, wherein said pressure switch is actuated by a brake actuation circuit including control valve means directly connected to a movable brake band of the braking means.

17. Control apparatus according to claim 1, wherein said engine control element means includes means for controlling the engine ignition system.

18. Control apparatus according to claim 1, wherein said engine control element means include means for controlling the engine fuel supply.

19. Control apparatus according to claim 1, wherein said switching control means and engine control element means include means operable to automatically control engine torque during upshifting to a higher gear.

* * * * *